G. A. Barron. Tea & Coffee Pot Strainer.
110420     Fig. 1.     Patented Dec 27 1870
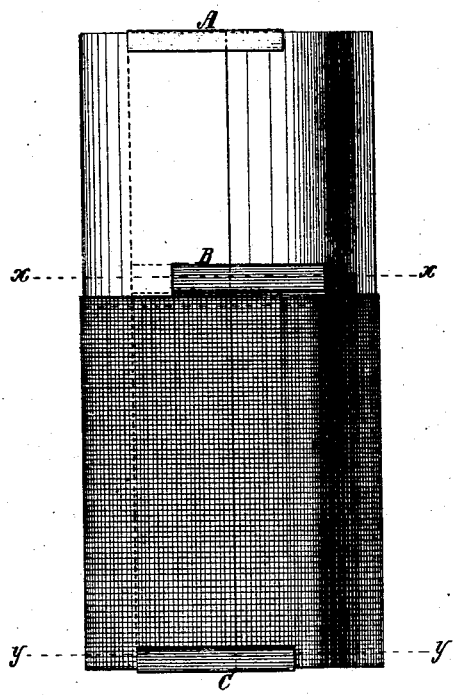
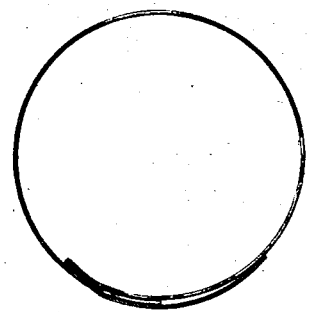
Fig. 2.
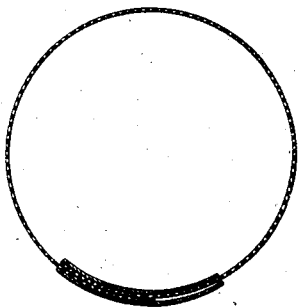
Fig. 3.

United States Patent Office.

GEORGE A. BARRON, OF PEMBROKE, MAINE.

Letters Patent No. 110,420, dated December 27, 1870.

IMPROVEMENT IN COFFEE-POT STRAINERS.

The Schedule referred to in these Letters Patent and making part of the same.

*To all whom it may concern:*

Be it known that I, GEORGE A. BARRON, of Pembroke, in the county of Washington and State of Maine, have invented a new and useful Improvement in Adjustable Coffee and Teapot-Strainer; and I do hereby declare that the following is a full, clear, and exact description thereof, which will enable others skilled in the art to make and use the same, reference being had to the accompanying drawing forming part of this specification.

This invention relates to a new and useful improvement in strainers for coffee and teapots, and consists in a cylinder open at each end, and composed in whole or in part of perforated metal or wire-gauze, and constructed so as to be varied in diameter to fit tea and coffee-pots of different sizes, as will be hereinafter more fully described.

In the accompanying drawing—

Figure 1 represents a side view of the strainer.

Figure 2 is a cross-section of fig. 1 on the line $x\ x$.

Figure 3 is a cross-section on the line $y\ y$.

Similar letters of reference indicate corresponding parts.

This strainer is made of sheet metal of suitable length, and of a diameter to suit ordinary coffee and teapots, but with the edges of the metal lapping by each other so that the strainer may be expanded or contracted in diameter, and thereby adjusted to pots of different sizes.

This strainer, as seen in the drawing, is made partly of perforated and partly of whole sheet metal. The strainer may be made entirely of perforated metal, if preferred.

A, B, and C are straps attached to one edge of the strainer, which confine the other edge so that it will slide as in grooves, and remain in any desired position when the strainer has been properly adjusted.

The strainer rests upon the bottom of the pot and extends up to or nearly to the lid. The tea or coffee is placed in the strainer with the necessary quantity of water, and when poured out the liquid, in reaching the spout of the pot, is strained of all tea-leaves and coffee-grounds.

The strainer is readily removed for cleaning or other purposes, and is a simple, inexpensive, but very useful article for the household.

Having thus described my invention,

I claim as new and desire to secure by Letters Patent—

A coffee and teapot-strainer, made adjustable, or so as to be increased or diminished in diameter, and substantially in the manner shown and described.

GEORGE A. BARRON.

Witnesses:
B. F. MINOR,
E. L. PATTANGALL.